United States Patent [19]

Mason

[11] Patent Number: 5,138,587
[45] Date of Patent: Aug. 11, 1992

[54] HARBOR APPROACH-DEFENSE EMBEDDED SYSTEM

[75] Inventor: Russell I. Mason, Glens Falls, N.Y.

[73] Assignee: The United States of America as represented by the Secretary of the Navy, Washington, D.C.

[21] Appl. No.: 722,582

[22] Filed: Jun. 27, 1991

[51] Int. Cl.⁵ .............................................. H04B 1/06
[52] U.S. Cl. .................................................... 367/136
[58] Field of Search .................. 367/87, 93, 80, 11, 367/135, 136

[56] References Cited

U.S. PATENT DOCUMENTS 4,081,784  3/1978  Wilson et al. ........................ 367/93
4,875,198  10/1989  Ariav ..................................... 367/93

Primary Examiner—Daniel T. Pihulic
Attorney, Agent, or Firm—Michael J. McGowan; Prithvi C. Lall; Michael F. Oglo

[57] ABSTRACT

Acoustically mapping (fingerprinting) the main channel, or 'Q' routes, of a harbor, over relatively long time periods by using transducers anchored near the harbor or Q route floor. Sonar pulse returns are processed so that echoes from acoustic targets are constantly monitored and integrated over long periods of time. The integrated sonar data are used to establish a characteristic bottom-image map for the presence and location of permanent objects such as debris, underwater formations and the like. The long term, integrated record is obtained to establish a reliable acoustic fingerprint or reference mapping of the bottom. This acoustical record or map, which is quite stable over long periods of time, is used to compare newly detected acoustic variances from the established map. A combination of active and passive acoustic sensors that are installed at fixed positions submerged in the channel permit the determination of both range and bearing when an intruding object has been detected.

13 Claims, 4 Drawing Sheets

HARBOR APPROACH-DEFENSE EMBEDDED SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the monitoring of harbor activity, and more particularly, to the detection of mines.

(2) Description of the Prior Art

There are nineteen harbors of prime interest in the United States, and many areas in other countries where maritime interests must be protected. These harbors vary in length, breadth, and depths from shallow to 300 feet. No system is yet known which can simply and reliably detect a wide variety of subsurface intruders such as swimmers and submarines, and mines launched by such intruders or by surface ships or aircraft. Although sweeps by ships are used for detecting mines and the like, these are very expensive, slow, intermittent, and do not provide reliable continuous monitoring and immediate surveillance of the entire channel.

SUMMARY OF THE INVENTION

The present invention is an acoustic-based system designed to detect and locate enemy mines and similar intruding objects placed in, or transiting, the ship traffic channels of important harbors.

The system and the associated method are based on acoustically mapping (fingerprinting) the main channel, or 'Q' routes, of a harbor, over relatively long time periods by using transducers anchored near the harbor or Q route floor. Sonar lo pulse returns are processed so that echoes from acoustic targets are constantly monitored and integrated over long periods of time. The integrated sonar data are used to establish a characteristic bottom-image map for the presence and location of permanent objects such as debris, underwater formations and the like. The long term, integrated record is obtained to establish a reliable acoustic fingerprint or reference mapping of the bottom. This acoustical record or map, which is quite stable over long periods of time, is used to compare newly detected acoustic variances from the established map. Thus, the new presence of intrusive objects can readily be detected by comparison with the "historical" map. The constantly updated map provides a stored image of the processed signals to be compared with the known, expected bottom acoustic map.

The system and method uses a combination of active and passive acoustic sensors that are installed at fixed positions submerged deep in the channel. These permit the determination of both range and bearing when an intruding object has been detected. Any detection of repeated new targets which are departures from the norm, provides an alarm and operator action. The sonar operating modes such as pulse rates, and the like, can then be changed from the shore station by the watch operator, to provide maximum acoustic performance including sensitivity, accuracy of range and bearing, and classification.

The invention provides a number of advantages relative to known, accepted techniques. The inventive system utilizes fixed position, active and passive sonar modes, to provide long term integration and bistatic operations. (The term "bistatic operation" is amplified upon in the detailed description hereinafter.) This affords superior detection capability against both mines and enemy or unknown intruders. The system provides a 24 hour-a-day, semiautomatic watch over a harbor or the entire length of the 'Q' route channel. Every yard is constantly monitored for detection of mine placement, intruder vessels, swimmers, or other objects.

The system provides a high probability of detection because the sensors are not subject to platform or motion noises and variations, or to the constantly changing sonar panorama inherent to moving ship-based sonars. The sonars of this fixed system are arranged for overlapping total insonification using both conventional and bistatic modes. These modes augment each other and lessen target aspect problems, thus providing better detection. The system can be easily planted and serviced by many conventional harbor vessels. The entire system can be stored and transported by air to emergency locations within days instead of weeks as required by ship transport.

The system requires minimal training and staffing for installation, maintenance, and operation. The system would fit in naturally with several types of naval vessels employed by the U.S. Naval Reserve Force known as craft of opportunity (COOP).

The system, unlike ship based systems, operates in all weather. It also can be used to provide practical navigation guidance for Q route traffic even in zero-zero weather or low visibility conditions. The system is designed to be correlated with and augmented by harbor radar. In this manner underwater detections made by the system can, in many cases, be confirmed by the harbor radar as identifiable surface traffic for verification purposes. Furthermore the system's inherent capability for use as a navigation guide can direct the "follow-up" craft to within a few feet of detected mine-like objects for classification and disposal action.

The system utilizes low power, high frequency, short range, closely spaced, active sonars, plus installed passive directional acoustic sensing of intruders. The system's security against disruption is enhanced by both those characteristics. The high frequency active pulses are not detectable at long ranges by enemy intruders so they are not alerted until too late. The passive sensing modes, in addition to detection, range and bearing of bistatically received echoes, would be very sensitive for detection of noise-making objects, including swimmers, their vehicles, and mobile mines.

The system does not require any surface floats or buoys that invite curiosity or damage. The system can be programmed for semiautomatic operation using electronic memory comparisons, or can be commanded manually for intensive study by expert shore based operators any time a suspicious event occurs. Should the system communication cable be damaged the engineering design permits the replacement with little more effort than that used by lobstermen working their traps. All modules and cables are of watertight, plug-in design retrievable by the service boats. The cable can be designed as a loop so cutting would not interrupt the operation.

BRIEF DESCRIPTION OF THE DRAWINGS

These and other objects and advantages of the invention will be explained more fully below with reference to the accompanying drawings, in which.

DESCRIPTION OF THE PREFERRED EMBODIMENT

Figure 1:
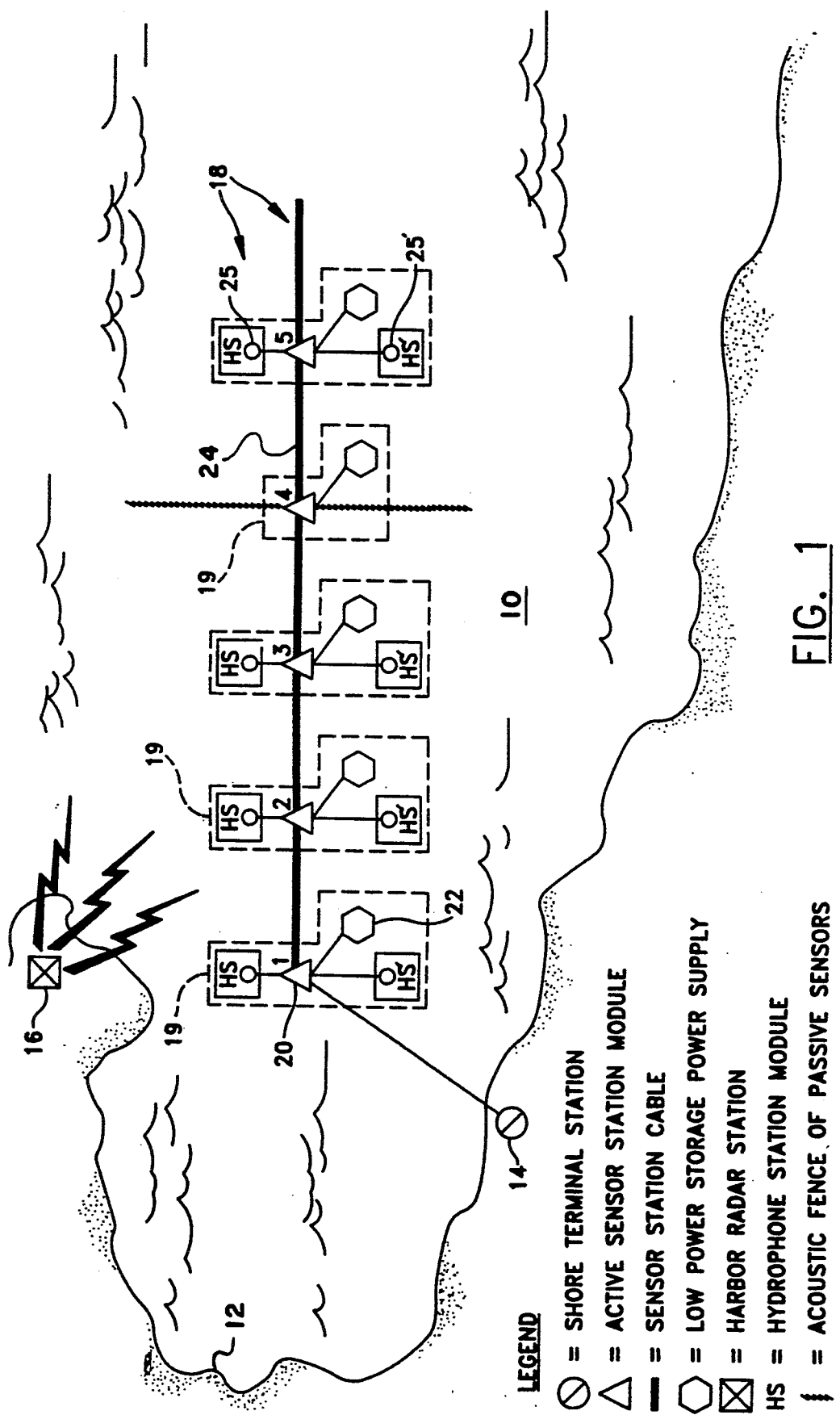
FIG. 1 is a diagrammatic representation of the main components of a harbor approach-defense embedded system. (It is to be understood that the diagrammatic representation is dimensionless, and the elements shown thereon need not be symmetrical as shown or of uniform placement as shown. Also the system depicted is illustrative of only one embodiment, of a number of alternative embodiments which the scope of the present invention is intended to cover.)

FIG. 1 is a diagrammatic representation of a harbor area 10, with the shore line 12, a shore terminal station 14 of the system which is the subject of this invention, and a conventional harbor radar station 16. As used herein, "harbor" includes harbor approaches and channels. The approach to the harbor is generally from right to left and, accordingly, the sensor string 18 of the inventive system is directly deployed in and along the bottom of the actual harbor Q route.

The system includes a plurality of sensor string units 19 which are spaced apart along the Q route, on the harbor bottom or at a depth safely beneath the harbor traffic. Each unit 19 includes an active sensor station module 20, which in turn includes an active transducer arrangement whereby sonic pulses that will insonify the channel route are generated. The active sensor station modules 20 are chosen to provide suitable output power and are designed with suitable selection of sonar operational parameters (including the sonar parameters of pulse frequency and pulse length). Desired output power can be determined and sonar parameters selected employing conventional and well known practices normally used in engineering studies and design analyses. Notwithstanding the desirability of performing engineering studies and design analyses to select optimum design parameters, several things can be said about the design parameters. Insofar as the invention is presently understood, the output power requirements of module 20 is of the order of a few watts. As noted in the Summary of Invention section hereinabove, it is desirable to select a pulse frequency which is sufficiently high to inhibit detection by enemy intruders at long ranges. The basic principles of this invention have been verified by tests in which the sonar pulse was transmitted at a frequency of 25 kc. using a pulse length which was variable from 3.0 to 16.5 milliseconds. In these tests the receiver was provided with the features of time varying gain and conventional selective filtering. The separation of sensor string units 19 on the string 18 will be a function of the geography, and the engineering of the sonars required to provide total, overlapping, area insonification. The pattern or directionality characteristics of the sonar pulses, and the associated receiving hydrophones, is engineered to satisfy the situation. Typically each sensor string unit 19 includes hydrophones, sonic projectors, power supplies, multiplexers, switches and microprocessors. This system by deliberate design avoids using brute force sonar engineering to obtain longer range performance. Instead it is engineered to use a multiplicity of low power, simpler, more reliable sonars, providing overlapping, low cost total insonification coverage of a limited area. This system thus reduces the false targets that plague brute force systems. It further enables totally reliable insonification with low cost elements and low power sources.

Each sensor string unit 19 preferably has its own long endurance, low power supply 22. If practical the batteries can be constantly charged with simple, bottom current driven, chargers (not shown). The almost constant currents flowing over moored devices in coastal or tidal channels make trickle possible and provide a simplified maintenance feature. The individual stations (shown in FIG. 1 as 1–5) are connected along a sensor string cable 24, typically consisting of armored fiber optics, which can be of any desired length. The cable may be buried in the harbor bottom to lessen cable damage. This cable acts as a bus for carrying all control and data signals between the terminal station 14 and the sensor string units 19.

In accordance with the invention the system components are so chosen and arranged to provide continuous total insonification, both passive and active, of the total area to be protected. This is impossible from ship-based systems. The echo ranging transducers included within active sensor station modules 20 both transmit the pulses and receive the echoes generated at the stations. The frequencies, pulse characteristics, repetition rates, bandwidth, power levels, etc., can be selected and changed via the cable by the monitoring operators at the shore station 14. In connection with the illustrative embodiment of invention presently being described and depicted in FIG. 1, each individual active sonar system is illustrated as a unitary station module which connotes that both the sonic pulse generator and transmitter element of an active sonar system and the echo sensing element of such system are parts of a single physical unit. Stated another way, the active sonar station modules 20 illustrate a type of active sonar system in which the system's sonic pulse generator and transmitter element and the system's echo sensing element are physically collocated. However, it is to be understood that this illustrative embodiment of the structure of an active sonar system is only one of at least two alternative embodiments of active sonar system. As another exemplary option of structure of active sonar system (not shown), a plurality of sonic pulse generators and transmitters are distributed along the harbor at a first set of fixed locations, and the corresponding plurality of echo sensors are distributed at a second different set of fixed locations. Thus, the sonic pulse generating device need not be physically located with the echo receiving device, although such arrangement may be preferable because it minimizes the number of locations where equipment must be installed and serviced.

In addition to its inclusion of an active sensor station 20, each sensor string unit 19 (with the exception of the one at the harbor's "acoustic fence") includes conventional passive hydrophone station modules HS, HS' respectively disposed laterally to and the other side of each active sensor station 20 and the sensor string cable 24. Insofar as the invention is presently understood, the lateral spacing of passive hydrophone stations define the boundary of the channel constituting the harbor approach being protected. Each hydrophone station module HS comprises a directional hydrophone equipment assembly unit providing passive directional finding and ranging (DIFAR) capability, of a conventional type used in anti-submarine warfare. In the illustrative embodiment of invention presently being described in conjunction with FIG. 1, each DIFAR passive hydrophone station module (HS or HS') is illustrated as an element of the corresponding sensor string unit 19.

Further in accordance with this illustrative embodiment there is included as a corporate part of each passive hydrophone station module (HS or HS') a passive hydrophone sensor (25 or 25', respectively).

However, it is to be understood that the illustrative embodiment of the structure of DIFAR passive hydrophone station modules HS, HS' depicted in FIG. 1 and just described, is only one of a number of alternative embodiments of such structure which the present invention is intended to be construed as covering. As an example of another alternative embodiment (not shown), the DIFAR passive hydrophone stations may be structured as satellite units independent of incorporation within sensor string units 19. Each such satellite DIFAR passive hydrophone station (not shown) is coupled directly to cable 24 through an individual tributary cable (not shown) branching off from cable 24. As an example of still another alternative embodiment (not shown), each DIFAR passive hydrophone station (not shown) may be structured as two physically separate units. One of these physically separate units would consist of a watertight package of the electronic equipment (not shown) which performs the signal processing. The other physically separate unit would consist of a passive hydrophone sensor. A signal coupling cable (not shown) would link the hydrophone sensor to the watertight package of electronic equipment which performs the signal processing. The watertight package of electronic equipment could be incorporated into a corresponding sensor string unit 19, while the hydrophone sensor could be located independent as desired. The only limit upon placement of the hydrophone sensor would be the practical limit of length of the signal coupling cable.

The DIFAR passive hydrophone station modules HS, HS' also passively receive bistatic echoes from targets insonified by the active sensor stations 20, thus utilizing different target echo reflecting aspects. The terms "bistatic echoes", "bistatic acoustics", "bistatic operations", "bistatic mode", etc., are well known terms in the art. They refer to a class of active pulse sonar systems in which echo signals are received at two spaced hydrophone stations. In accordance with known theory, by appropriately processing such bistatic echoes benefit can be achieved which are above those obtained from a system having a single sensing station. This bistatic potential is not currently used by ship-based mine hunting sonars because it is probably not practical for ship use.

One of the very important and unique features of the present system is that the sensors in active sensor station modules 20 and in hydrophone station modules (HS or HS') constantly monitor not only for intrusions, but automatically check the quality of the entire system performance. That is to say the system, in addition to detection of intrusions, receives the pulses that are sent out by the active sensor station modules 20 and thus can determine at all times if the system is achieving the expected level of insonification. Note that this provides self-checking. Based upon in-service experience, and formal and informal studies in connection with defensive systems of the type presently being described, this feature of self-checking is immensely important.

DIFAR passive hydrophone stations (HS or HS') serve the function of being sensitive and directional sensors useful for: (i) bistatic operation, (ii) sensitive passive detection of intruder noises, and (iii) other appropriate functions associated with the objectives of a harbor approach-defense embedded system requiring input from a DIFAR passive hydrophone station.

Figure 2A:
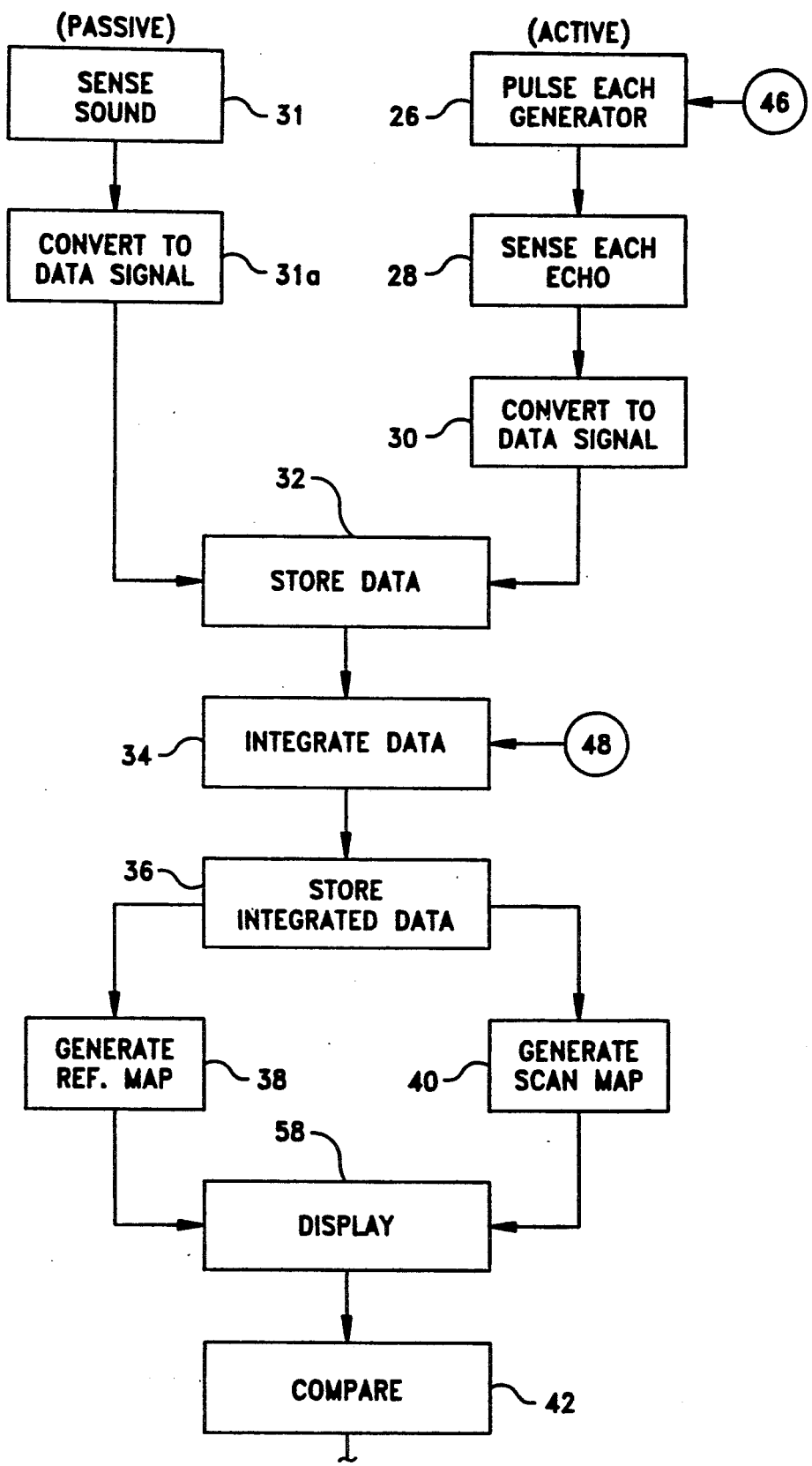
FIGS. 2(a) and 2(b) are flow diagrams of the signal processing associated with the preferred embodiment.
Figure 2B:
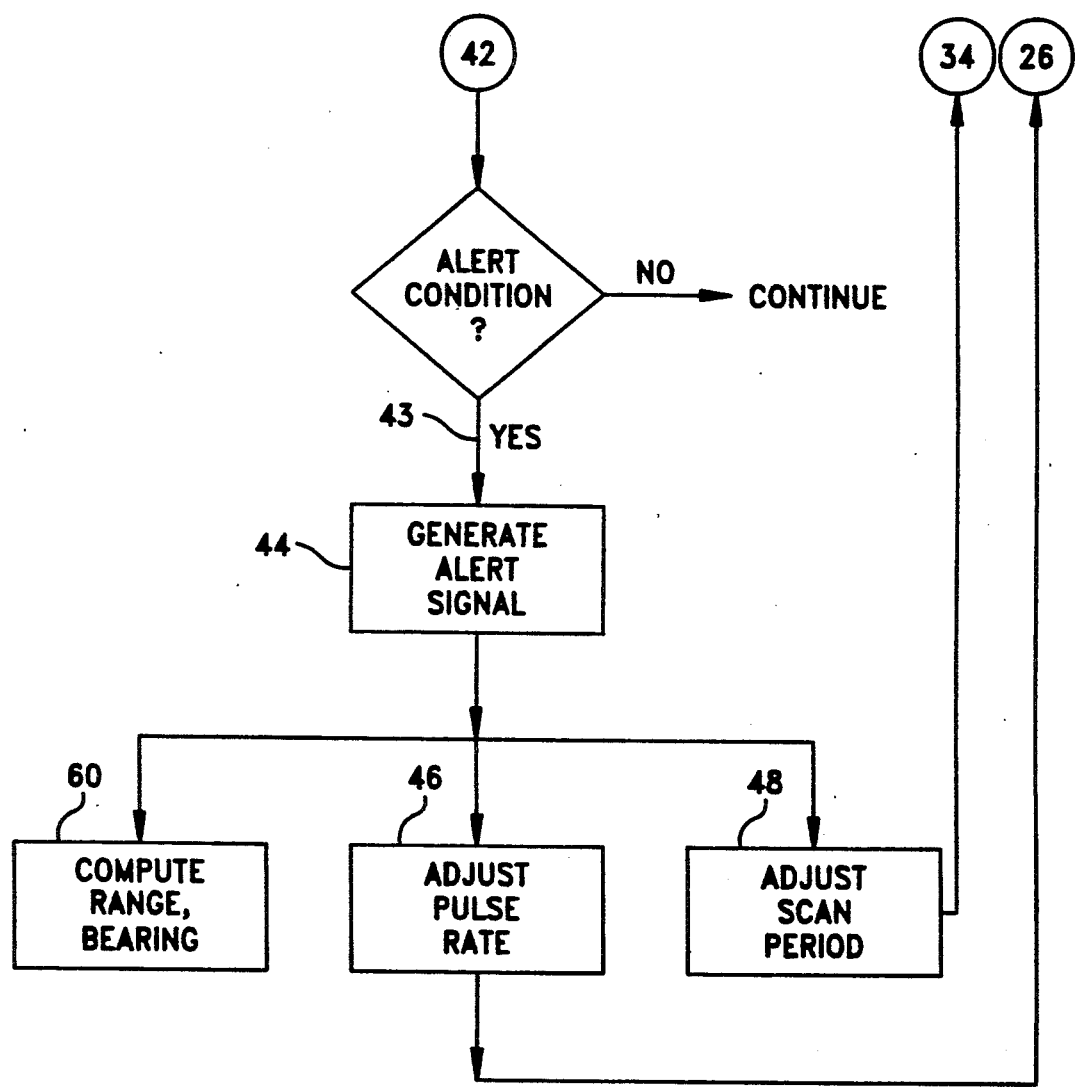

With reference to FIG. 1, FIG. 2(a) and FIG. 2(b), the construction and arrangement of the system which processes the signals received from sensor string 18 will now be described with respect to blocks representing functional process elements of the system. (The equipments which facilitate these process elements are all well known and understood by those having average skill in the art. Also, the system engineering design of the modules can be tailored to the local acoustic conditions, in accordance with conventional and well know principles of system engineering design.)

The active sonar sources are continuously pulsed (block at a convenient frequency, resulting in numerous echoes which may be sensed (block 28) by one or more of the sensors included in each active sensor station module 20. The sensor is coupled to appropriate signal processing circuitry for conversion (block 30) to a data signal, preferably digital. In the preferred embodiment, the passive data from hydrophone station modules HS are similarly sensed (block 31) and converted (block 31a).

Each sensor string unit 19 transmits the data, from both its active sensor station module 20 and its hydrophone station modules (HS, HS') to the shore station 14. The data are temporarily stored (block 32) and signal processed by the shore station digital/analog processors. More particularly, the data over selected periods of time are integrated (block 34), signal processed, and recorded or stored (block 36). A reference map is generated (block 38) from a long term integration of the data. The reference map represents time integrated acoustic signals received at each sensor string unit 18 including both signals from the active sensor station modules 20 therein and signals from the hydrophones in the hydrophone station modules HS. A variance image map, or simply "scan map" is also generated (block 40). The data integrated over selectable long terms, (minutes, hours, days) is displayed (block 58) by any convenient presentation, e.g., CRT, digital, analog, waterfall, strip chart, or the like. The scan map is produced by processing the integrated data from selected short time intervals. The scan map is compared (block 42) visually and/or electronically to the reference map. The scan map integration interval is usually different in duration or starting and ending points from the integration interval used in the process step of "reference map generation" (which was described hereinabove with reference to block 38). Any differences showing persistence result in an affirmative alert condition (decision 43) representing a new fixed target needing further investigation. Such new fixed signals, once established, also result in generation of an alert or alarm signal (block 44) to alert the operators. It should be noted that known long term echo producers, rocks, old debris, bottom features, etc. that have been previously identified and classified as "innocent targets" can be automatically and electronically eliminated from the decision making process. Only new persistent targets, exceeding chosen thresholds, alert the system. The operators at all times can adjust the sonar parameters via sensor string cable 24, to maximize detection effectiveness. Examples of these types of adjustments are (i) adjustment of the pulse rate for an active sensor station module 20 (block 46), and (ii) adjustment of the scan period for integration of active and passive signals (block 48).

Figure 3:
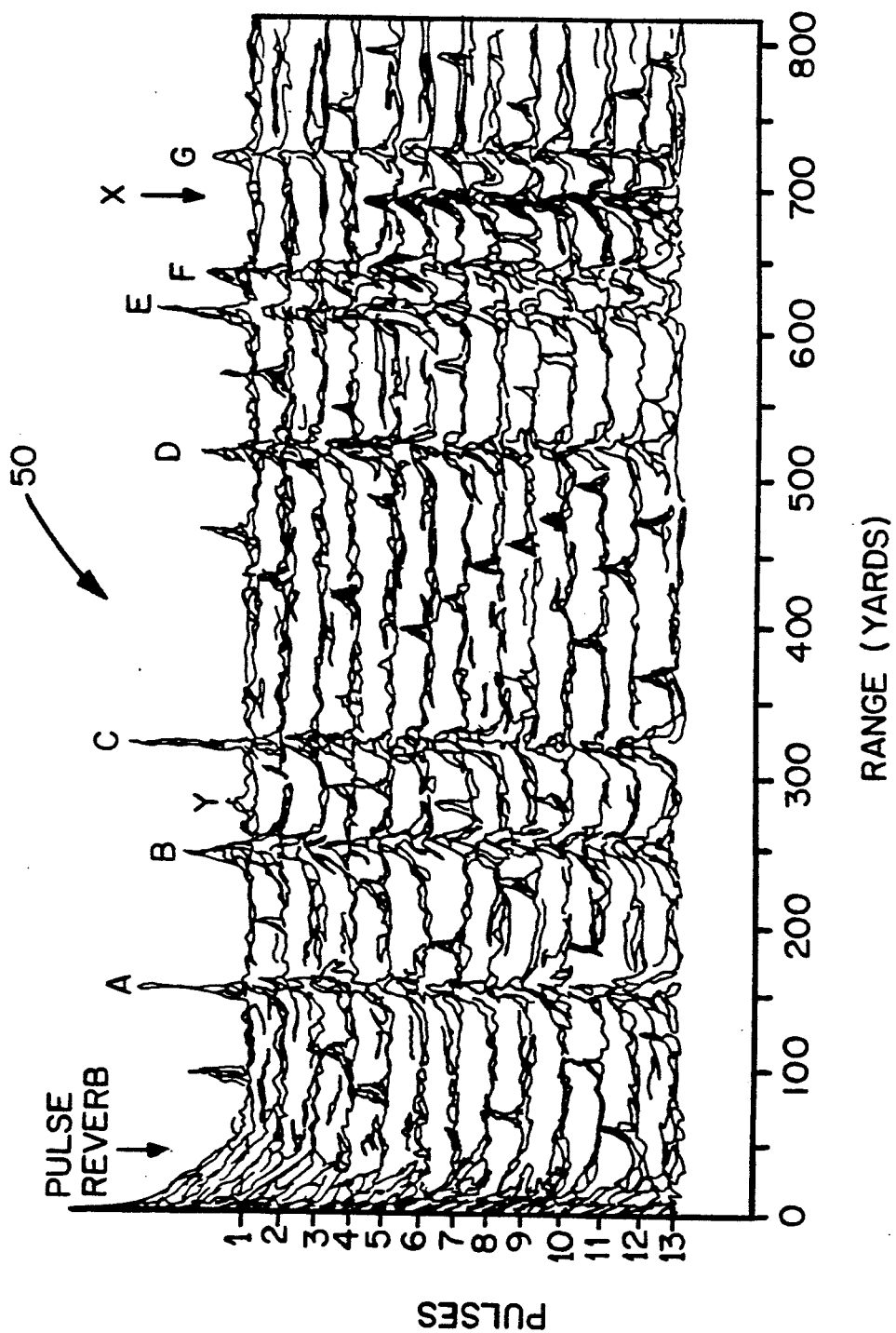
FIG. 3 is a representative analog-based image of the detection display.

FIG. 3 is an integrated pulse pattern display 50 obtained from actual tests in a major East Coast harbor area. A transducer was used to transmit and receive pulsed sonar signals. This pulse pattern displays echo energy as a function of range. Discrete echo pulses occur at ranges where energy reflectors resided at a time a specific insonification pulse illuminated the reflector. Six stationary, bottom located, permanent targets (A-B-C-D-E-F-G) and two new "targets" simulating intrusive objects (X and Y) were mapped. X displays a suspected intruder, or new "permanent" repeating target at a fixed point. Y displays, as a diagonal sequential line, a moving intruder transiting the area during the integration period.

The pulses indicated at X are significant because during pulses 1-4 no indication of an intrusive object was evident, whereas during each of the pulses 5-13 (and continuing) a relatively strong blip is indicated at the same range. The inconsistent blips such as Y may represent normal surface traffic, or other echo producers which, if initially suspicious, may be verified as normal or friendly, (or fish) by cross checking information from the harbor radar or the shore station. Operators may also be able to recognize blip characteristics that contain clue characteristics. Such classification may also be done at times by the more sophisticated signal processing at shore station 14.

There are well-known digital and analog signal processing techniques for gating, filtering, correlation, and statistical analysis that may be employed to assist operators in discriminating between surface traffic and suspicious underwater movement. For example, since stationary targets have no echo doppler characteristic the detection can indicate or reject moving objects. The echo patterns from moving fish can also provide classification clues.

It should be evident (in FIG. 3) that time integration of pulses 5 through 13 have echoes that are constant in range, evidently from fixed targets. The inconsistent blips such as Y indicate transients that are not stationary targets such as mines. The new X blip, starting at pulse 5 and repeating through pulse 13, is representative of a variance having possible significance an intrusive target, which time integration shows to be worthy of study.

With reference again to FIGS. 1 and 2(b), the preferred embodiment includes a plurality of hydrophone station modules (HS or HS') fixed in spaced relation on one and the other side of the string of active sensor stations 20. The passive hydrophone sensors 25 of these hydrophone stations HS are conventionally so chosen and constructed and arranged to provide high probability of passive detection of small craft, swimmers, swimmer vehicles, submarines, or other noise producing objects attempting entrance or exit by transit away from the Q route channel. The sensors are connected for signal transmission through its associated sensor string unit 19 and cable 24 to the shore station 14. In addition to detection of target sounds they also detect bistatic echoes generated by the pulses radiated from the line o radiators at the stations 20. It will be appreciated that this facilitates making range and bearing computations (block 60, FIG. 2(b)) by methods well known in this field. Very importantly, they also monitor the sonar performance of the active sensor station modules 20. The shore station 14 thus has constant acoustic surveillance, monitoring and control of the entire area covered by the system. This includes navigation guidance of follow-up craft investigating or servicing the line stations. It should be noted that any friendly vessel can use the system for safe, precise transit through the harbor, by the use of overside piloting sensors with navigational guidance from the monitoring shore station.

Thus, in accordance with the invention, sonar modes, both long and short term signal integration, plus bistatic acoustic are all obtained from fixed position sonars in a manner that cannot be achieved equally by surface ship sweeps. The problem associated with sweeping from surface ships is that the slightest movement of a transducer in complex signal paths, such as inherent to underwater acoustics, makes successive pulse echo ranging either impossible or degraded. Furthermore, the water path is constantly changing due to currents, temperature layers, etc. These can and do cause complete masking of all sonars. This is not a serious problem to fixed sonars such as those of the inventive system because the transient disturbances in the medium, caused by currents or movement by the sensors and the system, will not appear on the reference map. The representation of these transient disturbances on the scan map can often be recognized by the operator, who for example knows when currents of given directions start and end. Further, disturbed acoustic paths which wipe out sonar contacts occur in nature. A shipborne sonar does not necessarily know that the path has been interrupted, because hours may pass before the anomaly that quashes detection ends. The fixed system of the present invention automatically waits and is ready for detections when acoustic blockage ends. Thus, the probability of detection is enhanced by this long term integration system.

Obviously many modifications and variations of the present invention will become apparent in light of the above teachings. For example, the sequences of process functions 22, 28...60, FIGS. 2(a) and 2(b) can be coordinated and controlled by a real-time type minicomputer designed to perform its processing for processing in conjunction with real time events.

In light of the above, it is therefore understood that within the scope of the appended claims, the invention may be practiced otherwise than as specifically described.

What is claimed is:

1. A system for detecting the presence of intrusive objects in a harbor, comprising:
    a plurality of sonar pulse generator and transmitter units submerged in fixed positions in the harbor;
    a plurality of sonar pulse sensors submerged in fixed positions in the harbor;
    first means, coupled to the pulse sensors, for integrating over a time period of at least about one minute, pulses which originate from the pulse generator and transmitter units, and are sensed by the pulse sensors; and
    second means, coupled to the first means, for continually generating an acoustical image map of the harbor from the integrated pulses, whereby the presence of a newly introduced stationary object is manifested as a change on the image map.

2. The system of claim 1, including third means, cooperating with the second means, for comparing a reference image map generated from pulses integrated over a relatively long period of time of at least one hour with a variances image map generated from pulses integrated over a relatively short period of time of at least one minute.

3. The system of claim 1, wherein each sonar pulse generator and transmitter unit is coupled at the same location with one echo sensor, to form an active sensor station.

4. The system of claim 3, including a shore terminal station coupled to each of the active sensor stations, and wherein second means is located in the shore terminal station.

5. The system of claim 3, including
a plurality of passive sound sensors submerged in fixed, distributed locations in the harbor different from the locations of the active sensor stations, ea said passive sensor including means for generating a signal commensurate with the sensed sound; and
wherein the second means, for generating an acoustic image map, is responsive to the signals generated by the passive sound sensors.

6. The system of claim 5, wherein the active sensor stations are arranged along a reference line substantially representing the harbor channel center line, and the plurality passive sensors form first and second sets of passive sensors, said first and second sets of passive sensors being disposed in substantially equal laterally spaced relationships to one and the other sides of said reference line.

7. The system of claim 6, wherein the passive sensors are arranged in a plurality of sensor pairs, each sensor pair comprising one and another passive sensor disposed, respectively, at one and the other side of said line.

8. The system of claim 1, including
a plurality of passive sound sensors submerged in fixed, distributed locations in the harbor different from the locations of the sonar pulse sensors, each said passive sensor including means for generating a signal commensurate with the sensed sound; and
wherein the second means, for generating an acoustic map, is responsive to the signals generated by the passive sound sensors.

9. The system of claim 2, including
a plurality of passive sound sensors submerged in fixed, distributed locations in the harbor different from the locations of the sonar pulse sensors, each said passive sensor including means for generating a signal commensurate with the sensed sound; and
wherein the second means, for generating an acoustic map, is responsive to the signals generated by the passive sound sensors.

10. A method for detecting intrusive objects in a harbor, comprising:
projecting a plurality of sonar pulses from fixed locations beneath the surface of the water in the harbor;
at a plurality of first locations, detecting the projected pulses and pulse echoes from objects in the harbor;
continually integrating the detected pulses and echoes over a time period of at least about one minute;
storing the integrations as a signature characteristic of the harbor over a relatively long period of time greater than one minute; and
comparing changes in the detected pulses and echoes with the signature, to detect intrusive objects that have been stationary in the harbor for a relatively short period of time greater than one minute.

11. The method of claim 10, including the steps of,
passively detecting sounds in the harbor at a plurality of second locations different from the first locations and generating commensurate signals representing detected sound signals,
time integrating the commensurate signals, and
wherein the steps of comparing changes is responsive to the time integration of the commensurate signals.

12. A system for detecting the presence of a new, intrusive object in a harbor, comprising:
a plurality of sonar pulse generator and transmitter units submerged in fixed positions in the harbor;
a plurality of sonar pulse sensors submerged in fixed positions in the harbor and responsive to echo pulses which originate from the pulse generator and transmitter units;
first means, coupled to the pulse sensors, for integrating the echo pulses over a time period of at least about one minute; and
second means, coupled to the first means, for continually generating an acoustical image map of the harbor from the integrated pulses, whereby the presence of a newly introduced object is manifested as a change on the image map resulting from the integration of new echo pulses from said object which persist longer than normal ocean transitory echoes.

13. The system of claim 12, including third means, cooperating with the second means, for comparing as reference image map generated from echo pulses integrated over a first period of time chosen to provide an image that is characteristic of the echo pulses from permanent features of the harbor, with a variance image map generated from echo pulses integrated over a second period of time that is at least about one minute but less than said first period.

* * * * *